US008704880B2

(12) United States Patent
Lim et al.

(10) Patent No.: US 8,704,880 B2
(45) Date of Patent: Apr. 22, 2014

(54) OPTICAL MEASURING APPARATUS AND METHOD OF STEREOSCOPIC DISPLAY DEVICE

(75) Inventors: Kyong Ho Lim, Gyeonggi-do (KR); Don Gyou Lee, Seoul (KR); Jae Hong Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 469 days.

(21) Appl. No.: 12/978,934

(22) Filed: Dec. 27, 2010

(65) Prior Publication Data

US 2012/0105604 A1    May 3, 2012

(30) Foreign Application Priority Data

Oct. 29, 2010  (KR) ........................ 10-2010-0107234

(51) Int. Cl.
*H04N 13/04* (2006.01)

(52) U.S. Cl.
USPC ............................................. 348/51

(58) Field of Classification Search
USPC .................................. 348/41–162
See application file for complete search history.

(56) References Cited

U.S. PATENT DOCUMENTS

| | | | | |
|---|---|---|---|---|
| 2008/0204663 | A1* | 8/2008 | Balogh | 353/10 |
| 2009/0009508 | A1* | 1/2009 | Koo et al. | 345/214 |
| 2009/0051759 | A1* | 2/2009 | Adkins et al. | 348/53 |
| 2009/0141022 | A1* | 6/2009 | Kimpe | 345/419 |
| 2009/0244266 | A1* | 10/2009 | Brigham | 348/51 |
| 2010/0328653 | A1 | 12/2010 | Liu et al. | |
| 2011/0080401 | A1* | 4/2011 | Tan et al. | 345/419 |
| 2011/0194039 | A1* | 8/2011 | Shiomi | 349/15 |
| 2012/0113153 | A1* | 5/2012 | Casner | 345/690 |
| 2012/0257018 | A1* | 10/2012 | Shigemura et al. | 348/46 |

FOREIGN PATENT DOCUMENTS

| | | |
|---|---|---|
| GB | 2 404 106 | 1/2005 |
| GB | 2404106 | * 1/2005 |
| JP | 2010-245844 | 10/2010 |

OTHER PUBLICATIONS

"Measurement of Contrast Ratios for 3D Display," Kuo-Chung Huang, et al., Proc SPIE, vol. 4080, pp. 78-86, 2000, ISSN 0277-786X.

"*Subjective Evaluation of Cross Talk Disturbance in Stereoscopic Displays*," A. Hanzanot, et al., NHK (Japanese Broadcasting Corporation) Science & Technical Research Laboratories—Sponsored by the Society for Information Display, 20th International Display Research Conference, ISSN1083-1312/00.2001-0288, pp. 288-291.

(Continued)

*Primary Examiner* — Joseph Ustaris
*Assistant Examiner* — Talha Nawaz
(74) *Attorney, Agent, or Firm* — Morgan, Lewis & Bockius LLP

(57) ABSTRACT

An optical measuring apparatus and method for a stereoscopic display device are capable of measuring optical characteristics of the stereoscopic display device. The optical measuring apparatus includes a test image supplier for generating a 3D test signal, a 3D display for displaying left-eye image and/or right-eye image based on the 3D test signal supplied from the test image supplier, an image selection member for selectively transmitting the left-eye image and right-eye image to be displayed on the 3D display, and a light measuring device that measures luminance of the image transmitted via the image selection member and calculates 3D image crosstalk of the left eye image and the right eye image based on the measured luminance.

28 Claims, 8 Drawing Sheets

(56) References Cited

OTHER PUBLICATIONS

Understanding Crosstalk in Stereoscopic Displays, Andrew Woods, Centre for Marine Science & Technology, Curtin University of Technology, Perth, Australia, 3-D Systems and Applications Conference, Tokyo, Japan, May 19-21, 2010.
Chinese Office Action dated Dec. 13, 2013.

* cited by examiner

FIG.8

$$C/T[\%] = \frac{L_{LO,BW} - \text{(BB)}}{L_{LO,WB} - L_{LO,BB}} \times 100$$

Full black: L, Full white: R (top left pair)

FIG.9

$$C/T[\%] = \frac{L_{RO,BW} - \text{(BB)}}{L_{RO,WB} - L_{RO,BB}} \times 100$$

Full black: R, Full white: L (top left pair)

ically illustrates an optical measuring appa-# OPTICAL MEASURING APPARATUS AND METHOD OF STEREOSCOPIC DISPLAY DEVICE This application claims the benefit of the Korean Patent Application No. 10-2010-0107234 filed on Oct. 29, 2010, which is hereby incorporated by reference.

BACKGROUND OF THE INVENTION

1. Field of the Invention

The present invention relates to a stereoscopic display device, and more particularly, to an optical measuring apparatus and method for a stereoscopic display device, which facilitates measuring optical characteristics of the stereoscopic display device.

2. Background of the Related Art

With the practical use of 3D video broadcasting, a stereoscopic display device has recently attracted great attention as the next generation display device. Accordingly, there is an increasing need to measure optical characteristics of the stereoscopic display device, and to inform consumers of product superiority.

Since the stereoscopic display device is in its early stage and there is no objective standardized system for measuring the optical characteristics of the stereoscopic display device, it is difficult to provide the consumers with information about the optical characteristics of the stereoscopic display device. For this reason, even though there is a great attention given to the stereoscopic display device as the next generation display device, the 3D video broadcasting and stereoscopic display device has not been popularized as expected. Accordingly, it is highly desirable to develop an apparatus (system) and method of measuring the objective optical characteristics of the stereoscopic display device, for example, interocular crosstalk, GTG (gray-to-gray) interocular crosstalk, and interocular crosstalk for each viewing angle.

SUMMARY OF THE INVENTION

Accordingly, the present invention is directed to an optical measuring apparatus and method (system) for a stereoscopic display device that substantially obviates one or more problems due to limitations and disadvantages of the related art.

An aspect of the present invention is to provide an optical measuring apparatus and method of measuring interocular crosstalk of the stereoscopic display device.

Another aspect of the present invention is to provide an optical measuring apparatus and method of measuring GTG (gray-to-gray) interocular crosstalk of the stereoscopic display device.

Another aspect of the present invention is to provide an optical measuring apparatus and method of measuring interocular crosstalk for each viewing angle.

Additional advantages and features of the invention will be set forth in part in the description which follows and in part will become apparent from the description, or may be learned by practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, the optical measuring apparatus for a stereoscopic display device includes a test image supplier for generating a 3D test signal; a 3D display for displaying left-eye image and/or right-eye image based on the 3D test signal supplied from the test image supplier; an image selection member for selectively transmitting the left-eye image and right-eye image to be displayed on the 3D display, and a light measuring device which measures luminance of the image transmitted via the image selection member and calculates 3D image crosstalk of the left eye image and/or the right eye image based on the measured luminance.

In another aspect of the present invention, the optical measuring method includes displaying left-eye image and/or right-eye image based on a 3D test signal; selectively transmitting the left-eye image and/or right-eye image to be displayed on the 3D display via an image selection member; measuring luminance of the left-eye image and/or right-eye image transmitted via the image selection member through the use of light measuring device; and calculating 3D image crosstalk of the left-eye image and/or right-eye image based on the measured luminance.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings:

FIGS. 8 and 9 schematically illustrate a method for measuring interocular crosstalk;

DETAILED DESCRIPTION OF THE PREFERRED EMBODIMENTS

Figure 1:
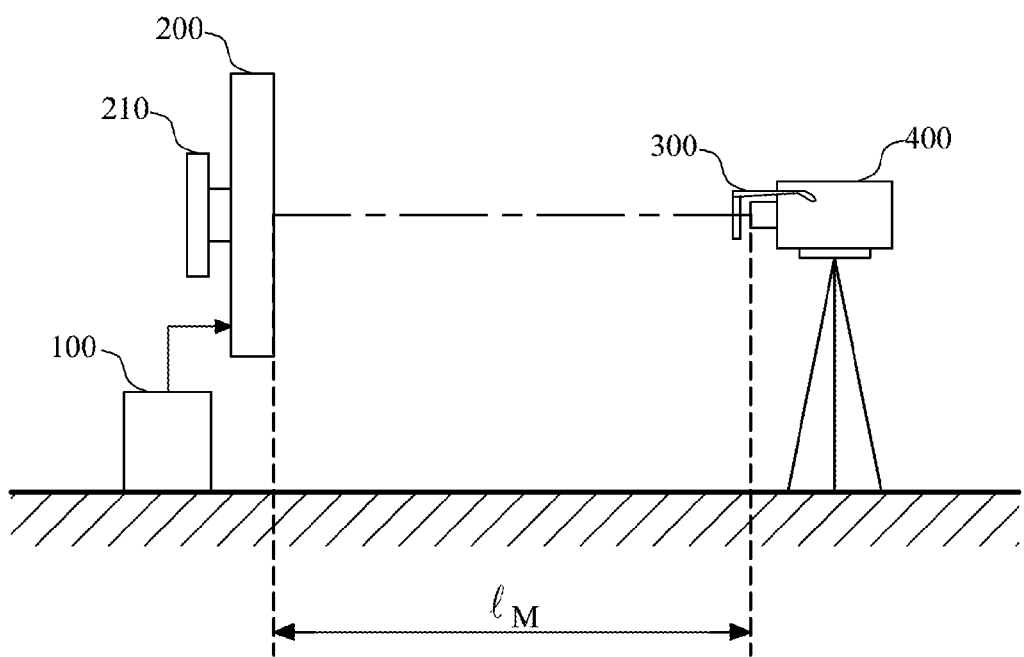
FIG. 1 schematically illustrates an optical measuring apparatus for a stereoscopic display device according to an exemplary embodiment of the present invention.

Reference will now be made in detail to the exemplary embodiments of the present invention, examples of which are illustrated in the accompanying drawings. Wherever possible, the same reference numerals will be used throughout the drawings to refer to the same or like parts.

There is proposed an optical measuring apparatus and method suitable for measuring the various optical characteristics of a stereoscopic display device. These optical characteristics include, but are not limited to, interocular crosstalk, GTG (gray-to-gray) interocular crosstalk, and interocular crosstalk for each viewing angle.

The optical measuring apparatus and method for a stereoscopic display device according to an exemplary embodiment of the present invention may be applied to the following 3D display methods:

1. Stereoscopic image displaying method including displays representing temporally interlaced (high frame rate) images and time dividing shutter glasses;
2. Stereoscopic image displaying method including displays with front screen switchable polarizer representing temporally interlaced images and linear or circular polarizer glasses; and
3. Stereoscopic image displaying method including displays with patterned retarder representing spatially interlaced images and linear or circular polarizer glasses.

All or some parts of these measuring methods may also be applied to other types of stereoscopic displays using glasses not listed above.

An explanation for an optical measuring apparatus and method for a stereoscopic display device according to an exemplary embodiment of the present invention and terms used therefor refer to the following documents:

1. IEC60068-1: Environmental Testing—Part 1: General and guidance;
2. IEC60107-1: Method of measurement on receivers for television broadcast transmissions—Part 1: General considerations—Measurement at radio and video frequencies; and
3. CIE15:2004: Colorimetry, 3rd Edition.

Hereinafter, an optical measuring apparatus for a stereoscopic display according to the exemplary embodiment will be described with reference to the accompanying drawings. FIG. 1 schematically illustrates an optical measuring apparatus for a stereoscopic display device according to the exemplary embodiment. Referring to FIG. 1, the optical measuring apparatus for a stereoscopic display device includes a test image supplier 100, a 3D display 200, an image selection member 300, and a light measuring device 400.

The test image supplier 100 generates a 3D test signal to measure the optical characteristics of the 3D display 200, and supplies the generated 3D test signal to the 3D display 200. In this case, measuring items for measuring the optical characteristics of the 3D display may include, but are not limited to, interocular crosstalk, interocular crosstalk for each gray level, and interocular crosstalk for each viewing angle.

The interocular crosstalk indicates crosstalk of glass-type stereoscopic display between a white pattern screen and a black pattern screen. For example, the interocular crosstalk includes crosstalk generated when a left-eye image or a right-eye image is a full screen white image, and also includes crosstalk generated when a left-eye image or a right-eye image is a full screen black image.

The 3D test signal includes the left-eye image (L) and right-eye image (R) that are temporally or spatially divided and displayed on the 3D display 200. At this time, the left-eye image (L) and right-eye image (R) may be generated to correspond to the optical characteristics of the 3D display 200, namely, the following measuring items, as shown in the following Table 1. In this case, a measuring point may indicate the center on a screen of the 3D display 200.

TABLE 1

| Measuring item | Input signal | | Measuring point |
| --- | --- | --- | --- |
| | Left-eye (L) image | Right-eye (R) image | |
| 3D crosstalk | Full screen white | Full screen black | P0 |
| | Full screen black | Full screen white | (the center |
| | Full screen black | Full screen black | of display) |
| GTG (gray-to-gray) 3D crosstalk | Full screen gray 1 | Full screen gray 2 | P0 |
| | Full screen gray 2 | Full screen gray 1 | |
| | Full screen gray 2 | Full screen gray 2 | |
| Crosstalk for each viewing angle | Full screen white | Full screen black | P0 |
| | Full screen black | Full screen white | |
| | Full screen black | Full screen black | |
| | Full screen gray 1 | Full screen gray 2 | |
| | Full screen gray 2 | Full screen gray 1 | |

The 3D display 200 is held by a holder 210 such that the holder 210 is installed inside a dark room (not shown) maintained at an illumination of 1 Lux or less. At this time, the 3D display 200 may be vertically held to the ground while being maintained at a predetermined height from the floor of the dark room, or may be held while being rotated at a predetermined direction (horizontal direction or vertical direction). At this time, the dark room may be maintained at a temperature of 20° C.±5° C., a relative humidity of 25% to 85%, and a pressure of 86 kPa to 106 kPa.

The 3D display 200 displays the left-eye image (L) and/or the right-eye image (R) that are temporally or spatially divided based on the 3D test signal supplied from the test image supplier 100. For this, the 3D display 200 may include a 3D display panel (not shown) and a panel driver (not shown).

The 3D display panel displays an image according to a shutter glass method or patterned retarder method.

The 3D display panel using the shutter glass method may include a plurality of unit pixels (not shown). Each of the plural unit pixels may include red, green, and blue sub-pixels for displaying images, which are formed at every region obtained by crossing a plurality of horizontal lines and vertical lines.

The 3D display panel using the patterned retarder method may include a plurality of unit pixels (not shown), a plurality of left-eye retarder patterns, and a plurality of right-eye retarder patterns. Each of the plural unit pixels may include red, green, and blue sub-pixels for displaying images, which are formed at every region obtained by crossing a plurality of horizontal lines and vertical lines.

At this time, the plurality of horizontal lines or vertical lines may be divided into left-eye image displaying lines and right-eye image displaying lines. For example, the odd-numbered horizontal line may be set as the left-eye image displaying line, and the even-numbered horizontal line may be set as the right-eye image displaying line. On the contrary, the odd-numbered horizontal line may be set as the right-eye image displaying line, and the even-numbered horizontal line may be set as the left-eye image displaying line.

According to another example, the odd-numbered vertical line may be set as the left-eye image displaying line, and the even-numbered vertical line may be set as the right-eye image displaying line. On the contrary, the odd-numbered vertical line may be set as the right-eye image displaying line, and the even-numbered vertical line may be set as the left-eye image displaying line.

Each of the plural left-eye retarder patterns may be formed corresponding to the left-eye image displaying line, to thereby polarize the left-eye image (L) displayed in the left-eye image displaying line. Each of the plural right-eye retarder patterns may be formed corresponding to the right-eye image displaying line, to thereby polarize the right-eye image (R) displayed in the right-eye image displaying line. The left-eye retarder pattern and right-eye retarder pattern have different optical axes from each other. For example, the left-eye retarder pattern and right-eye retarder pattern may have a phase difference of 90°.

The panel driver displays the left-eye image (L) and/or the right-eye image (R), which correspond to the 3D test signal supplied from the test image supplier 100, on the 3D display panel according to a driving method of the 3D display panel.

In the 3D display panel using the shutter glass method, the panel driver alternately displays the left-eye image (L) and right-eye image (R) corresponding to the 3D test signal supplied from the test image supplier 100 every one frame. For this, the panel driver may include an image converter (not shown) for converting the 3D test signal to the left-eye image (L) and right-eye image (R), and a shutter control signal generator (not shown) for generating and transmitting a shutter control signal corresponding to the left-eye image (L) or right-eye image (R) displayed on the 3D display panel. The shutter control signal is able to synchronize a time point of displaying the left-eye image (L) and right-eye image (R) displayed on the 3D display panel with a time point of turning on/off left-eye and right-eye lenses of the shutter glass.

In the 3D display panel using the patterned retarder method, the panel driver displays the left-eye image (L) and right-eye image (R) corresponding to the 3D test signal supplied from the test image supplier 100 in the left-eye image displaying line and right-eye image displaying line. For this, the panel driver may include an image converter (not shown) for converting the 3D test signal to the left-eye image (L) and right-eye image (R).

If the 3D display panel is a liquid crystal display panel, the 3D display may include a backlight unit (not shown) for emitting light to the 3D display panel.

Figure 2:
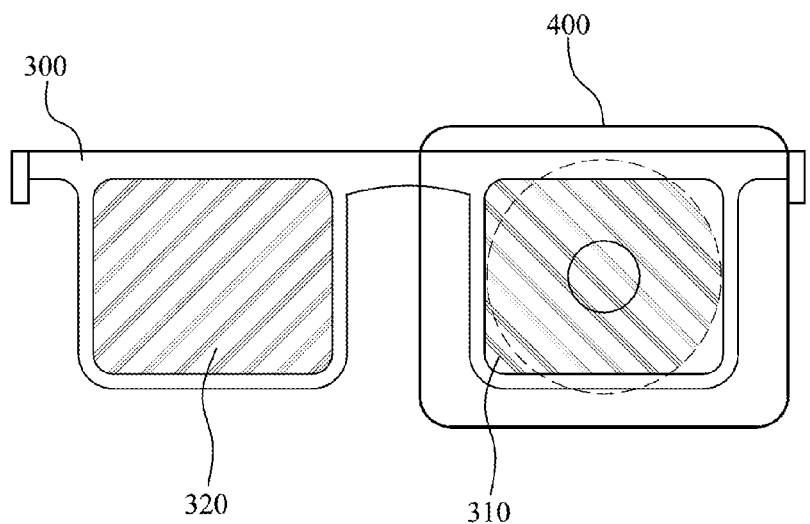
FIG. 2 schematically illustrates an image selection member held adjacent to a light measuring device shown in FIG. 1.

The image selection member 300 is installed to face the 3D display 200. The image selection member 300 selectively transmits the left-eye image (L) and right-eye image (R) displayed on the 3D display 200 so that the selectively-transmitted image is supplied to the light measuring device 400. For this, as shown in FIG. 2 the image selection member 300 may include a left-eye lens of the glasses (for convenience, hereinafter, referred to as 'left lens') 310, and a right-eye lens of the glasses (for convenience, hereinafter, referred to as 'right lens') 320. The left lens 310 transmits only the left-eye image (L) out of the left-eye image (L) and right-eye image (R) temporally or spatially divided and displayed on the 3D display 200.

According to one exemplary embodiment of the present invention, if the 3D display 200 displays the left-eye image (L) on the basis of the shutter glass method, the left lens 310 may include a liquid crystal layer that is turned on/off by the shutter control signal outputted from the 3D display 200 so as to transmit only the left-eye image (L).

According to another exemplary embodiment, if the 3D display 200 displays the left-eye image (L) on the basis of the patterned retarder method, the left lens 310 may include a polarizing filter that transmits only the left-eye image (L).

When the optical characteristics of the left-eye image (L) displayed on the 3D display 200 are measured, the left lens 310 may be installed facing the light measuring device 400. In this case, the left lens 310 may be held in a glass holder (not shown) or the light measuring device 400. When the left lens 310 is held in the glass holder (not shown) or light measuring device 400, the left lens 310 is positioned adjacent to the light measuring device 400 without being in contact with the light measuring device 400. The left lens 310 may be provided at a predetermined interval, for example, at least 10 mm from the light measuring device 400. The right lens 320 transmits only the right-eye image (R) displayed on the 3D display 200.

According to one exemplary embodiment of the present invention, if the 3D display 200 displays the right-eye image (R) on the basis of the shutter glass method, the right lens 320 may include a liquid crystal layer that is driven by the shutter control signal outputted from the 3D display 200, to thereby transmit only the right-eye image (R).

According to another exemplary embodiment of the present invention, if the 3D display 200 displays the right-eye image (R) on the basis of the patterned retarder method, the right lens 320 may include a polarizing filter that transmits only the right-eye image (R).

When the optical characteristics of the right-eye image (R) displayed on the 3D display 200 are measured, the right lens 320 is installed facing the light measuring device 400. In this case, the right lens 320 may be held in an additional glass holder (not shown) provided adjacent to the light measuring device 400, or a glass holder (not shown) provided in the light measuring device 400. The left lens 310 is provided at a predetermined interval from the light measuring device 400 without being in contact with the light measuring device 400, for example, at least 10 mm.

Figure 3:
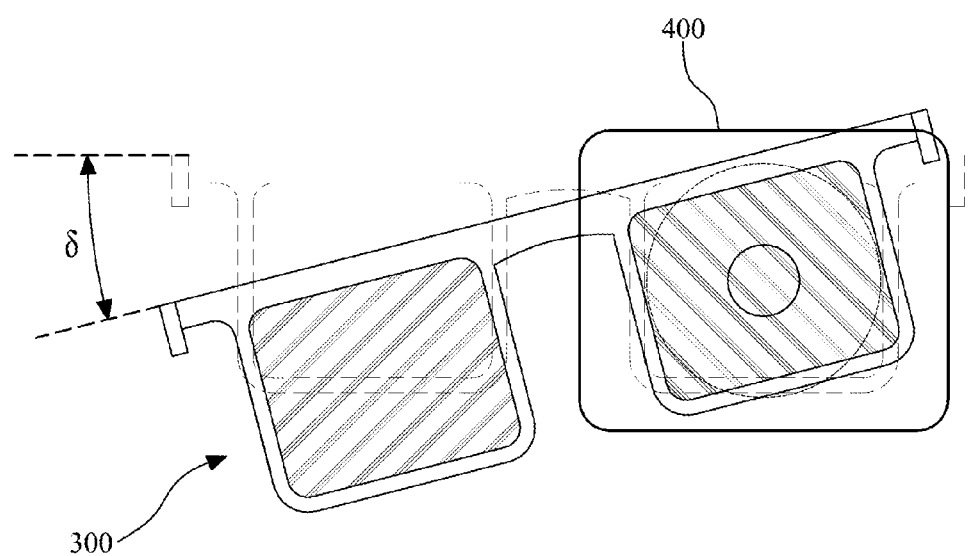
FIG. 3 schematically illustrates an image selection member held adjacent to a light measuring device while being provided at a predetermined rotation angle.

As shown in FIG. 3, the image selection member 300 may be held in the glass holder (not shown) while being positioned at a predetermined rotation angle (θ) with respect to the light measuring device 400. Thus, the optical characteristics of the 3D display 200 are measured by rotating the image selection member 300. The rotation angle (θ) may be defined by a clockwise rotation angle shown from the light measuring device 400, namely, an angle rotated with respect to a horizontal axis of the 3D display 200. In the meantime, the image selection member 300 may be formed in a film or plate type, wherein the image selection member 300 is movably provided in the front of the light measuring device 400. The glass holder may have a slide mechanism to change the lens from left to right and from right to left, and/or a mechanism to rotate or tilt the left lens 310 and right lens 320.

In FIG. 1, the light measuring device 400 measures luminance of the left-eye image and right-eye image transmitting through the image selection member 300. At this time, the light measuring device 400 is provided at a predetermined measuring distance ($l_M$) from the 3D display 200, and the light measuring device 400 is installed inside the dark room while being perpendicularly aligned with the 3D display 200. Also, the light measuring device 400 may be installed inside the dark room while being provided at a predetermined angle from a horizontal and/or vertical direction of the 3D display 200. Herein, the light measurement device 400 may be vertically held to the ground. The measuring distance ($l_M$) between the light measuring device 400 and the 3D display 200 may be above 2 m (meter), or 3L (herein, 'L' may be a height (V), width (H), or diagonal length of the 3D display).

Figure 4:
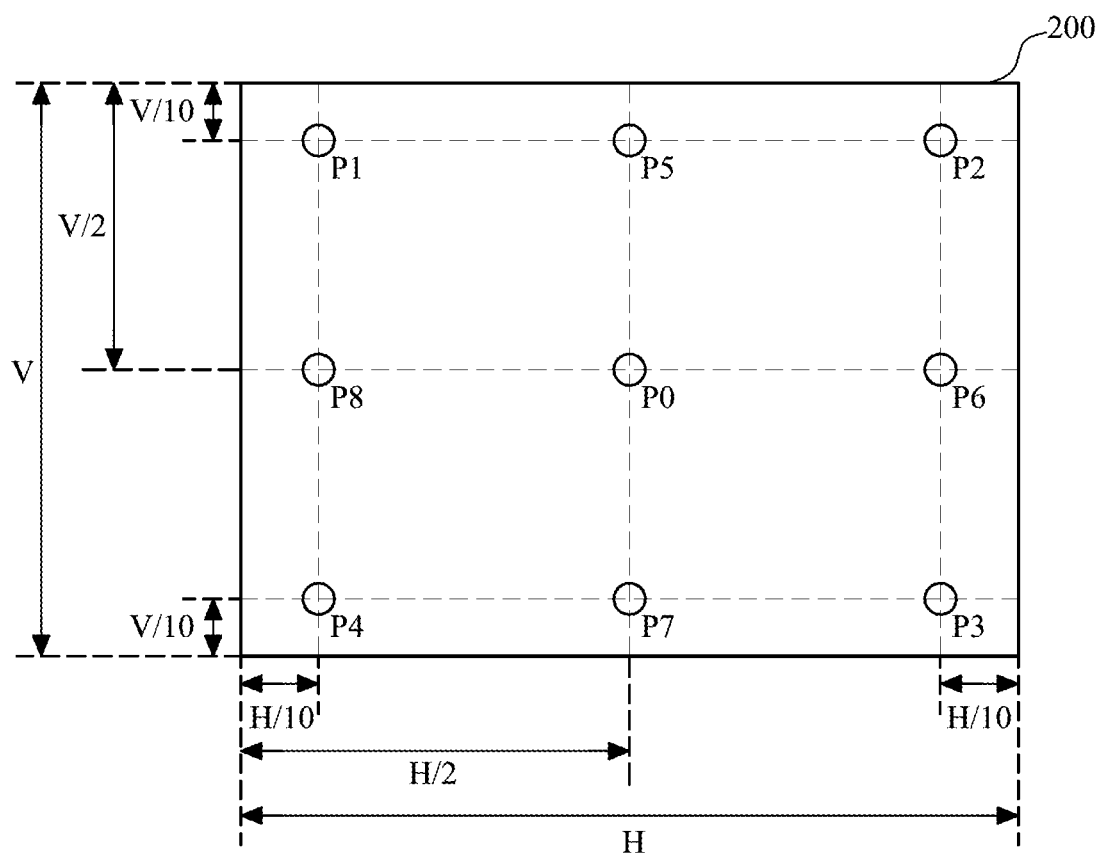
FIG. 4 schematically illustrates a plurality of measuring points set on a 3D display according to an exemplary embodiment of the present invention.

As shown in FIG. 4, the light measuring device 400 is positioned parallel to each of plural measuring points (P0 to P8) on the screen of the 3D display 200. At this time, the light measuring device 400 may be provided to be perpendicular to the measuring points (P0 to P8) on the screen of the 3D display 200. Also, the light measuring device 400 may be provided while having a predetermined angle from a horizontal and/or vertical direction with respect to each measuring point (P0 to P8) on the 3D display 200.

The plural measuring points may include, but are not limited to, measuring points 0 to 8 (P0 to P8). The measuring point 0 (P0) may be set to be positioned in the center of the screen of the 3D display 200. Each of the measuring points 1 to 4 (P1 to P4) may be set to be positioned at each corner of the screen of the 3D display 200. For example, each of the measuring points 1 to 4 (P1 to P4) is positioned at a predetermined corner portion that is maintained at a predetermined interval corresponding to $1/10$ each of the height (V) and width (H) of the screen from each edge of the screen of the 3D display 200. The measuring points 5 to 8 (P5 to P8) may be positioned between each of the neighboring measuring points 1 to 4 (P1 to P4). For example, the measuring points 5 to 8 are positioned on the central lines of the height (V) and width (H) of the screen, and each of the measuring points 5 to 8 is maintained at a predetermined interval corresponding to $1/10$ each of the height (V) and width (H) of the screen from each edge of the screen of the 3D display 200.

Figure 5:
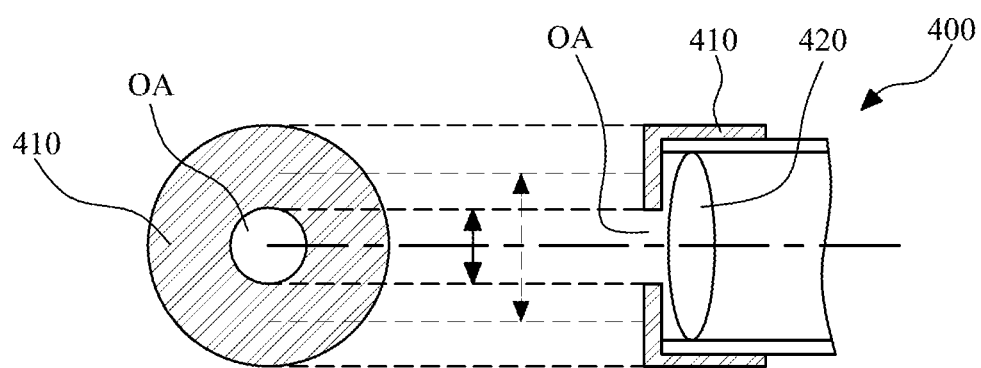
FIG. 5 schematically illustrates an aperture of a light measuring device according to an exemplary embodiment of the present invention.
Figure 6:
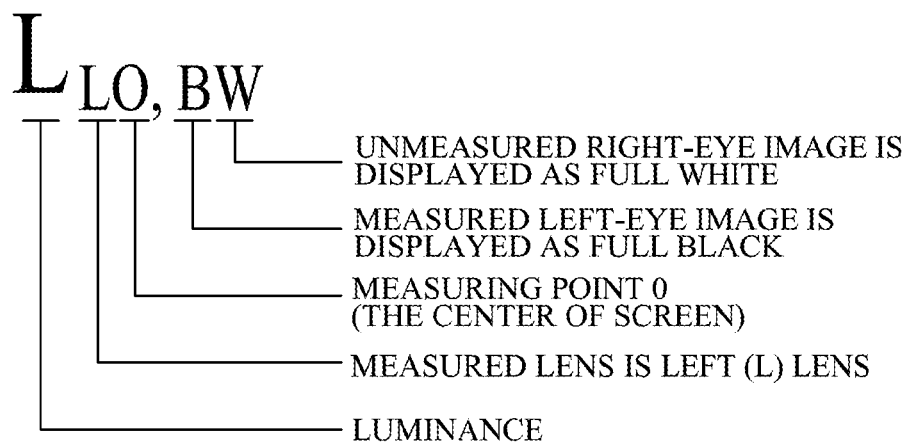
FIGS. 6 and 7 schematically illustrates symbols used for explaining the exemplary embodiment of the present invention.
Figure 7:
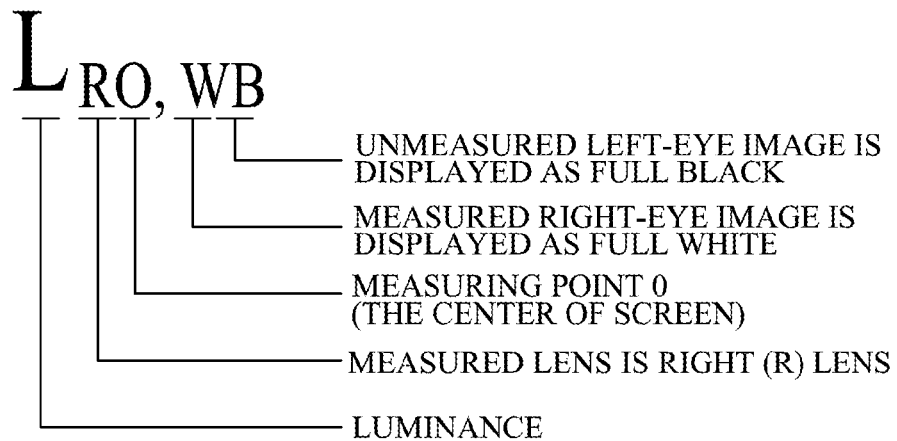

As shown in FIG. 5, the light measuring device 400 may include an aperture (OA), on which the image transmitting the image selection member 300 is incident. The size of the aperture (OA) may be adjusted by an aperture ring 410, wherein the size of the aperture (OA) is smaller than the size of the left lens and right lens. Also, an object lens 420 of the light measuring device 400, on which the light is incident by the aperture (OA), is smaller than the size of the left lens and right lens; and the object lens 420 is positioned adjacent to the aperture (OA) at maximum.

The light measuring device 400 measures the luminance of the left-eye image (L) and/or right-eye image (R) incident via the aperture (OA) and object lens 420. The light measuring device 400 analyzes the luminance of the left-eye image and/or right-eye image, and generates optical characteristic information of the 3D display 200 based on the analyzed luminance. In this case, the optical characteristic information may include, but are not limited to, interocular crosstalk, GTG (gray-to-gray) interocular crosstalk, and interocular crosstalk for each viewing angle. That is, the light measuring device 400 generates information about at least one of the interocular crosstalk, GTG interocular crosstalk, interocular crosstalk for each viewing angle and the like, and provides a user with the generated information.

Hereinafter, various exemplary embodiments for measuring the luminance of the left-eye image (L) and/or right-eye image (R) will be explained as follows. In addition, various exemplary methods for generating the information about the interocular crosstalk, GTG (gray-to-gray) interocular crosstalk, and interocular crosstalk for each viewing angle based on the luminance information, namely, various methods for measuring the interocular crosstalk, GTG (gray-to-gray) interocular crosstalk, and interocular crosstalk for each viewing angle, will be described as follows.

First, symbols used in the following exemplary methods for measuring the interocular crosstalk, GTG interocular crosstalk, and interocular crosstalk for each viewing angle will be defined in FIGS. 6 to 9. Also, '$L_{LO,BB}$' indicates the luminance value at the measuring point P0 by the left lens when both the left-eye image and right-eye image are displayed as the full black images; '$L_{RO,BB}$' indicates the luminance value at the measuring point P0 by the right lens when both the left-eye image and right-eye image are displayed as the full black images; '$X_{RtoL}$' indicates the interocular crosstalk to the left lens; and '$X_{LtoR}$' indicates the interocular crosstalk to the right lens.

According to the first exemplary embodiment of the present invention, the interocular crosstalk of the image displayed on the 3D display 200 is measured. At this time, the left image (L) and/or right image (R) are temporally or spatially divided, and displayed on the 3D display 200. Any one of the left-eye image and right-eye image may be displayed as the full screen white image, and the other is displayed as the full screen white image or full screen black image. Also, the full screen white image is 100% white-colored image, and the full screen black image is 100% black-colored image.

A method for calculating the interocular crosstalk [%] of image transmitted via the left lens 310 will be explained with reference to FIG. 8. The left-eye image of the 3D display 200 is displayed as the full screen white image, and the right-eye image of the 3D display 200 is displayed as the full screen black image. In this case, the light measuring device 400 is aligned to be parallel to the left lens 310 of the image selection member 300. Then, the light measuring device 400 measures the luminance corresponding to the center (P0) of the screen of the 3D display 200, records the measured luminance information as a first luminance value ($L_{LO,WB}$), and provides the first luminance value ($L_{LO,WB}$). At this time, the first luminance value ($L_{LO,WB}$) indicates the standard luminance value of the image incident via the left lens according to the left-eye white image and right-eye black image.

Thereafter, as an image signal displayed on the 3D display 200 is changed, the left-eye image is displayed as the full screen black image, and the right-eye image is displayed as the full screen white image. At this time, the light measuring device 400 is aligned to be parallel to the left lens 310 of the image selection member 300. Then, the light measuring device 400 measures the luminance corresponding to the center (P0) of the screen of the 3D display 200, records the measured luminance information as a second luminance value ($L_{LO,BW}$), and provides the second luminance value ($L_{LO,BW}$). At this time, the second luminance value ($L_{LO,BW}$) indicates the standard luminance value of the image incident via the left lens according to the left-eye black image and right-eye white image. Thereafter, as an image signal displayed on the 3D display 200 is changed, both the left-eye image and right-eye image are displayed as the full screen black images. At this time, the light measuring device 400 is aligned to be parallel to the left lens 310 of the image selection member 300.

Then, the light measuring device 400 measures the luminance corresponding to the center (P0) of the screen of the 3D display 200, records the measured luminance information as a third luminance value ($L_{LO,BB}$), and provides the second luminance value ($L_{LO,BB}$). At this time, the third luminance value ($L_{LO,BB}$) indicates the standard luminance value of the image incident via the left lens according to the left-eye black image and right-eye black image.

The light measuring device 400 calculates the interocular crosstalk [%] to the left lens 310 by applying the first to third luminance values provided from the light measuring device 400 to the following equation 1. At this time, the interocular crosstalk [%] to the left lens 310 indicates the crosstalk of image transmitted via the left lens 310.

$$X_{RtoL} = \frac{L_{L0.BW} - L_{L0.BB}}{L_{L0.WB} - L_{L0.BB}} \times 100\%$$ [Equation 1]

The interocular crosstalk ($X_{RtoL}$) [%] to the left lens 310 is obtained by dividing a second standard value into a first standard value, wherein the first standard value is obtained by subtracting the third luminance value ($L_{LO,BB}$) from the second luminance value ($L_{LO,BW}$), and the second standard value is obtained by subtracting the third luminance value ($L_{LO,BB}$) from the first luminance value ($L_{LO,WB}$). When a user wearing the image selection member 300 views the 3D image, it is possible to measure how much the right-eye image is interfered by the left-eye image viewed via the left lens 310.

An exemplary method for calculating the interocular crosstalk [%] with respect to the right lens 320 will be explained with reference to FIG. 9.

The right-eye image of the 3D display 200 is displayed as the full screen white image, and the left-eye image of the 3D display 200 is displayed as the full screen black image. In this case, the light measuring device 400 is aligned to be parallel to the right lens 320 of the image selection member 300. Then, the light measuring device 400 measures the luminance corresponding to the center (P0) of the screen of the 3D display 200, records the measured luminance information as a fourth luminance value ($L_{RO,WB}$), and provides the fourth luminance value ($L_{RO,WB}$). At this time, the fourth luminance value ($L_{RO,WB}$) indicates the standard luminance value of the image incident via the right lens according to the right-eye white image and left-eye black image.

Thereafter, as an image signal displayed on the 3D display 200 is changed, the right-eye image is displayed as the full screen black image, and the left-eye image is displayed as the full screen white image. At this time, the light measuring device 400 is aligned to be parallel to the right lens 320 of the image selection member 300. Then, the light measuring device 400 measures the luminance corresponding to the center (P0) of the screen of the 3D display 200, records the measured luminance information as a fifth luminance value ($L_{RO,BW}$), and provides the fifth luminance value ($L_{RO,BW}$). At this time, the fifth luminance value ($L_{RO,BW}$) indicates the standard luminance value of the image incident via the right lens according to the right-eye black image and left-eye white image.

Thereafter, as an image signal displayed on the 3D display 200 is changed, both the right-eye image and left-eye image are displayed as the full screen black images. At this time, the light measuring device 400 is aligned to be parallel to the right lens 320 of the image selection member 300. Then, the light measuring device 400 measures the luminance corresponding to the center (P0) of the screen of the 3D display 200, records the measured luminance information as a sixth luminance value ($L_{RO,BB}$), and provides the sixth luminance value ($L_{RO,BB}$). At this time, the sixth luminance value ($L_{RO,BB}$) indicates the standard luminance value of the image incident via the right lens according to the left-eye black image and right-eye black image.

The light measuring device 400 calculates the interocular crosstalk [%] to the right lens 320 by applying the fourth to sixth luminance values provided from the light measuring device 400 to the following equation 2.

$$X_{LtoR} = \frac{L_{RO,BW} - L_{RO,BB}}{L_{RO,WB} - L_{RO,BB}} \times 100\% \qquad \text{[Equation 2]}$$

The interocular crosstalk ($X_{LtoR}$)[%] to the right lens 320 is obtained by dividing a fourth standard value into a third standard value, wherein the fourth standard value is obtained by subtracting the sixth luminance value ($L_{RO,BB}$) from the fourth luminance value ($L_{RO,WB}$), and the third standard value is obtained by subtracting the sixth luminance value ($L_{RO,BB}$) from the fifth luminance value ($L_{RO,BW}$). When a user wearing the image selection member 300 views the 3D image, it is possible to measure how much the left-eye image is interfered by the right-eye image viewed via the right lens 320.

The first exemplary embodiment of the present invention enables measuring of the objective interocular crosstalk of the stereoscopic display device, and providing the measured interocular crosstalk information to the user. The aforementioned method of measuring the interocular crosstalk according to the first embodiment of the present invention may be carried out after aging the 3D display 200 and image selection member 300 for a predetermined time period. The aforementioned explanation shows that the interocular crosstalk is measured at the measuring point P0, but not necessarily. The interocular crosstalk may be measured at any one of the first to eighth measuring points show in FIG. 4.

According to the second exemplary embodiment of the present invention, the GTG (Gray-To-Gray) interocular crosstalk of the image displayed on the 3D display 200 is measured. To measure the GTG interocular crosstalk, a plurality of sample gray levels for the left-eye image and right-eye image may be set up. In this case, the 3D display 200 displays the left-eye image and right-eye image that are temporally or spatially divided.

If the image displayed on the 3D display 200 is displayed with 256 gray levels from gray level 0 to gray level 255, the plurality of sample gray levels are determined with the predetermined gray levels selected every predetermined numbers of gray level among the total 256 gray levels.

For example, as shown in the following Table 2, the unit of 64 gray levels may be obtained by dividing 4 into the 256 gray levels, to thereby determine the plurality of sample gray levels. In this case, the gray level 0 is referred to as the standard gray level. That is, if the calculated sample unit of gray level is 64, the gray level 63 corresponding to the 64(th) gray level from 0 may be set as the gray level for displaying the image. Also, the gray level 127 may be set as the gray level for displaying the image.

TABLE 2

| | g2 | | | | |
|---|---|---|---|---|---|
| g1 | 0 | 63 | 127 | 191 | 255 |
| 0 | L_GTG_C/T1 | L_GTG_C/T2 | L_GTG_C/T3 | L_GTG_C/T4 | L_GTG_C/T5 |
| 63 | L_GTG_C/T6 | L_GTG_C/T7 | L_GTG_C/T8 | L_GTG_C/T9 | L_GTG_C/T10 |
| 127 | L_GTG_C/T11 | L_GTG_C/T12 | L_GTG_C/T13 | L_GTG_C/T14 | L_GTG_C/T15 |
| 191 | L_GTG_C/T16 | L_GTG_C/T17 | L_GTG_C/T18 | L_GTG_C/T19 | L_GTG_C/T20 |
| 255 | L_GTG_C/T21 | L_GTG_C/T22 | L_GTG_C/T23 | L_GTG_C/T24 | L_GTG_C/T25 |
| Average | | XX | Maximum | | XX |
| Standard deviation | | XX | Minimum | | XX |

In above Table 2, the left-eye image and right-eye image are displayed at the respective gray level 0, 63, 127, 191, and 255. At this time, the light measuring device 400 measures the luminance, and generates the luminance information between each gray level. Also, the light measuring device 400 calculates the luminance information between each gray level, and calculates the GTG interocular crosstalk based on the analyzed luminance information.

According to another example, the number of sample gray levels may be increased to enhance preciseness in measurement of the GTG interocular crosstalk. For example, the unit of 32 gray levels may be obtained by dividing 8 into the 256 gray levels, to thereby determine the plurality of sample gray levels. That is, the left-eye image and right-eye image are displayed at the respective gray level 0, 31, 63, 95, 127, 159, 191, 223 and 255. At this time, the light measuring device 400 measures the luminance, and generates the luminance information between each gray level. Also, the light measuring device 400 analyzes the luminance information between each gray level, and calculates the GTG interocular crosstalk based on the analyzed luminance information.

A method for calculating the GTG interocular crosstalk to the left lens 310 will be explained in detail.

The left-eye image of the 3D display 200 is displayed as the full screen gray 1, and the right-eye image of the 3D display 200 is displayed as the full screen gray 2. The gray level values of the full screen gray 1 and full screen gray 2 may be set as shown in above Table 2.

The light measuring device 400 may be aligned to be parallel to the left lens 310 of the image selection member 300. Then, the light measuring device 400 measures the luminance corresponding to the center (P0) of the screen of the 3D display 200, records the measured luminance information as a first GTG luminance value ($L_{L0,g1,g2}$), and provides the first GTG luminance value ($L_{L0,g1,g2}$). At this time, the first GTG luminance value ($L_{L0,g1,g2}$) indicates the luminance value of the image incident via the left lens according to the left-eye first gray level image (full screen gray 1) and right-eye second gray level image (full screen gray 2). The first gray level image and second gray level image may have the same gray level value, or may have different gray level values.

Thereafter, as an image signal displayed on the 3D display 200 is changed, the left-eye image is displayed as the full screen gray 2, and the right-eye image is displayed as the full screen gray 1. At this time, the gray level values of the full screen gray 1 and full screen gray 2 may be set as shown in above Table 2.

The light measuring device 400 may be aligned to be parallel to the left lens 310 of the image selection member 300. Then, the light measuring device 400 measures the luminance corresponding to the center (P0) of the screen of the 3D display 200, records the measured luminance information as a second GTG luminance value ($L_{L0,g1,g2}$), and provides the second GTG luminance value ($L_{L0,g1,g2}$). At this time, the second GTG luminance value ($L_{L0,g1,g2}$) indicates the luminance value of the image incident via the left lens according to the left-eye second gray level image and right-eye first gray level image. The first gray level image and second gray level image may have the same gray level value, or may have the different gray level values. Thereafter, as an image signal displayed on the 3D display 200 is changed, both the left-eye image and right-eye image are displayed as the full screen gray 2.

The light measuring device 400 may be aligned to be parallel to the left lens 310 of the image selection member 300. Then, the light measuring device 400 measures the luminance corresponding to the center (P0) of the screen of the 3D display 200, records the measured luminance information as a third GTG luminance value ($L_{L0,g2,g2}$), and provides the third GTG luminance value ($L_{L0,g2,g2}$). At this time, the third GTG luminance value ($L_{L0,g2,g2}$) indicates the luminance value of the image incident via the left lens according to the left-eye second gray level image and right-eye second gray level image.

The light measuring device 400 calculates the GTG interocular crosstalk ($X_{RtoL,g1,g2}$)[%] of the image incident via the left lens 310 by applying the first to third GTG luminance values provided from the light measuring device 400 to the following equation 3.

$$X_{RtoL,g1,g2} = \frac{L_{L0,g2,g1} - L_{L0,g2,g2}}{L_{L0,g1,g2} - L_{L0,g2,g2}} \times 100\% \quad \text{[Equation 3]}$$

The GTG interocular crosstalk [%] to the left lens 310 is obtained by dividing a second GTG standard value into a first GTG standard value, wherein the second GTG standard value is obtained by subtracting the third GTG luminance value ($L_{L0,g2,g2}$) from the first GTG luminance value ($L_{L0,g1,g2}$); and the first GTG standard value is obtained by subtracting the third GTG luminance value ($L_{L0,g2,g2}$) from the second luminance value ($L_{L0,g1,g2}$).

When a user wearing the image selection member 300 views the 3D image, it is possible to measure how much the right-eye image is interfered by the left-eye image viewed via the left lens 310.

An exemplary method for calculating the GTG interocular crosstalk to the right lens 320 will be explained in detail.

The right-eye image of the 3D display 200 is displayed as the full screen gray 1, and the left-eye image of the 3D display 200 is displayed as the full screen gray 2. At this time, the gray level values of the full screen gray 1 and full screen gray 2 may be set by the same method as the aforementioned method for measuring the interocular crosstalk to the left lens 310.

The light measuring device 400 may be aligned to be parallel to the right lens 320 of the image selection member 300. Then, the light measuring device 400 measures the luminance corresponding to the center (P0) of the screen of the 3D display 200, records the measured luminance information as a fourth GTG luminance value ($L_{R0,g1,g2}$), and provides the fourth GTG luminance value ($L_{R0,g1,g2}$). At this time, the fourth GTG luminance value ($L_{R0,g1,g2}$) indicates the luminance value of the image incident via the right lens according to the right-eye first gray level image and left-eye second gray level image. The first gray level image and second gray level image may have the same gray level value, or may have different gray level values.

Thereafter, as an image signal displayed on the 3D display 200 is changed, the right-eye image is displayed as the full screen gray 2, and the left-eye image is displayed as the full screen gray 1. At this time, the gray level values of the full screen gray 1 and full screen gray 2 may be set by the same method as the aforementioned method for measuring the interocular crosstalk to the left lens 310.

The light measuring device 400 may be aligned to be parallel to the right lens 320 of the image selection member 300. Then, the light measuring device 400 measures the luminance corresponding to the center (P0) of the screen of the 3D display 200, records the measured luminance information as a fifth GTG luminance value ($L_{R0,g2,g1}$), and provides the fifth GTG luminance value ($L_{R0,g2,g1}$). At this time, the fifth GTG luminance value ($L_{R0,g2,g1}$) indicates the luminance value of the image incident via the right lens according to the right-eye second gray level image and left-eye first gray level image. The first gray level image and second gray level image may have the same gray level value, or may have different gray level values.

Thereafter, as an image signal displayed on the 3D display 200 is changed, both the left-eye image and right-eye image are displayed as the full screen gray 2.

The light measuring device 400 may be aligned to be parallel to the right lens 320 of the image selection member 300. Then, the light measuring device 400 measures the luminance corresponding to the center (P0) of the screen of the 3D display 200, records the measured luminance information as a sixth GTG luminance value ($L_{R0,g2,g2}$), and provides the sixth GTG luminance value ($L_{R0,g2,g2}$). At this time, the sixth GTG luminance value ($L_{R0,g2,g2}$) indicates the luminance value of the image incident via the right lens according to the left-eye second gray level image and right-eye second gray level image.

The light measuring device 400 calculates the GTG interocular crosstalk ($X_{LtoR,g1,g2}$)[%] of the image incident via the right lens 320 by applying the fourth to sixth GTG luminance values provided from the light measuring device 400 to the following equation 4.

$$X_{LtoR,g1,g2} = \frac{L_{R0g2,g1} - L_{R0g2,g2}}{L_{R0g1,g2} - L_{R0g2,g2}} \times 100\% \quad \text{[Equation 4]}$$

The GTG interocular crosstalk [%] to the right lens 320 is obtained by dividing a fourth GTG standard value into a third GTG standard value, wherein the fourth GTG standard value is obtained by subtracting the sixth GTG luminance value ($L_{R0,g2,g2}$) from the fourth GTG luminance value ($L_{R0,g1,g2}$); and the third GTG standard value is obtained by subtracting the sixth GTG luminance value ($L_{R0,g2,g2}$) from the fifth luminance value ($L_{R0,g2,g1}$).

When a user wearing the image selection member 300 views the 3D image, it is possible to measure how much the right-eye gray image incident via the right lens 320 is interfered by the left-eye gray image.

The second exemplary embodiment of the present invention enables measuring of the objective GTG interocular crosstalk of the stereoscopic display device, and providing the measured GTG interocular crosstalk information to the user. The aforementioned method of measuring the GTG interocular crosstalk according to the second embodiment of the present invention may be carried out after aging the 3D display 200 and image selection member 300 for a predetermined time period. The aforementioned explanation shows that the GTG interocular crosstalk is measured at the measuring point P0, but not necessarily. The GTG interocular crosstalk may be measured at any one of the first to eighth measuring points show in FIG. 4.

According to the third exemplary embodiment of the present invention, the interocular crosstalk of the image displayed on the 3D display 200 is measured at every viewing angle. In this case, the 3D display 200 displays the left-eye image and right-eye image that are temporally or spatially divided.

Figure 10:
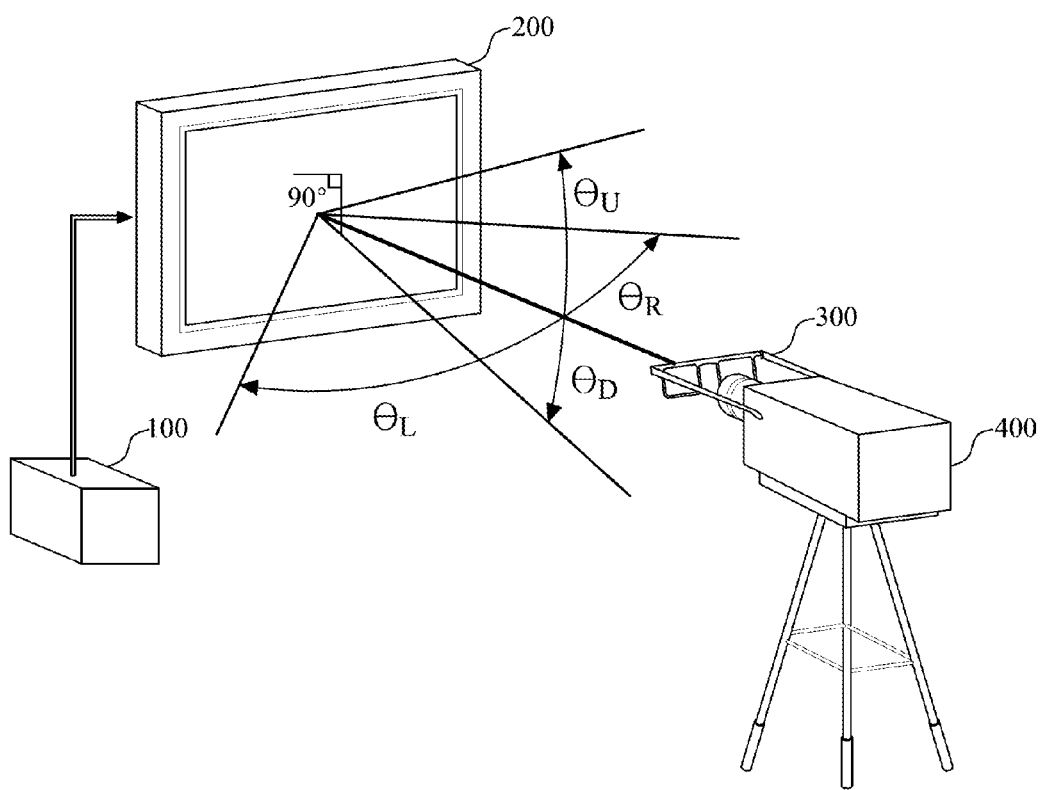
FIGS. 10 to 12 schematically illustrates an optical measuring apparatus and method for a stereoscopic display device to measure interocular crosstalk for each viewing angle.
Figure 11:
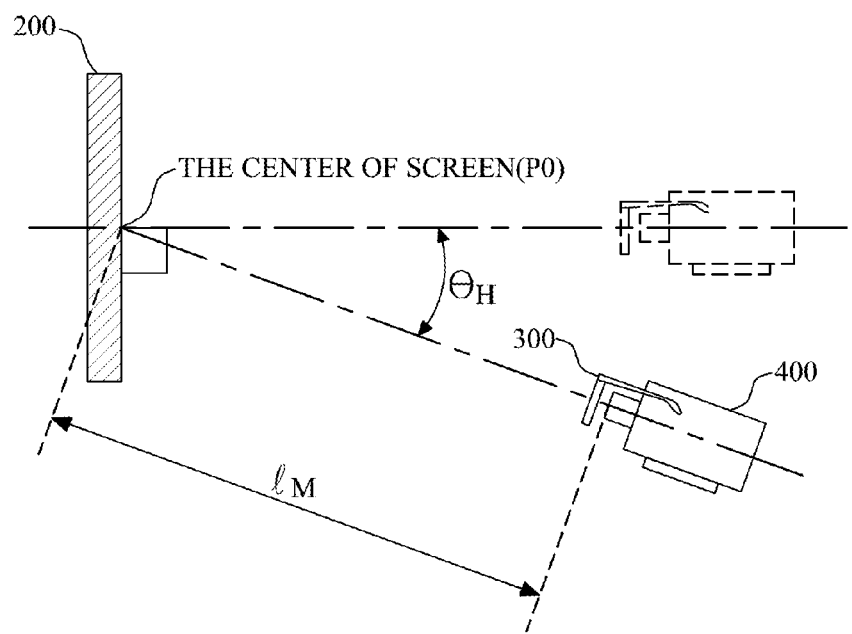

If the interocular crosstalk for each viewing angle is measured, as shown in FIGS. 10 and 11, under a condition that horizontal and vertical angles of the viewing angle are changed regularly, the luminance of left-eye image and right-eye image displayed on the 3D display 200 may be measured by the light measuring device 400.

In this case, the horizontal angle ($\theta_H$) and vertical angle ($\theta_V$) of the viewing angle may be changed within a range from 0° to 90°, as shown in the following Table 3.

TABLE 3

| Meas-uring item | Input signal | | Meas-uring point | Measuring angle | |
|---|---|---|---|---|---|
| | Left-eye image (L) | Right-eye image (R) | | Horizontal angle | Vertical angle |
| Interocular crosstalk for each viewing angle | Full screen white | Full screen black | P0 | 0°~90° angle between screen and light measuring device | 0°~90° angle between screen and light measuring device |
| | Full screen black | Full screen white | | | |
| | Full screen black | Full screen black | | | |
| | Full screen gray 1 | Full screen gray 2 | | | |
| | Full screen gray 2 | Full screen gray 1 | | | |
| | Full screen gray 2 | Full screen gray 2 | | | |

For example, the horizontal angle ($\theta_H$) may be increased by angles ±5° from 0°. That is, the luminance of image displayed on the 3D display 200 is measured at the corresponding horizontal viewing angle when the horizontal angle ($\theta_H$) is selectively changed from 0° to ±5°, ±10°, ±15°, ±20°, ±25°, ±30°, ±35°, ±40°, ±45°, ±50°, ±55°, ±60°, ±65°, ±70°, ±75°, ±80°, and ±85°. Also, the vertical angle ($\theta_V$) may be increased by angles ±5° from 0°. That is, the luminance of image displayed on the 3D display 200 is measured at the corresponding vertical viewing angle when the vertical angle ($\theta_V$) is selectively changed from 0° to ±5°, ±10°, ±15°, ±20°, ±25°, ±30°, ±35°, ±40°, ±45°, ±50°, ±55°, ±60°, ±65°, ±70°, ±75°, ±80°, and ±85°.

In this case, the 3D display 200 displays the left-eye image (L) and/or right-eye image (R) that are temporally or spatially divided. The image on the 3D display 200 may be displayed as the full screen white image and full screen black image used in the method for measuring the interocular crosstalk according to the first embodiment of the present invention. Also, the image on the 3D display 200 may be displayed as the full screen gray 1 and full screen gray 2 used in the method for measuring the GTG interocular crosstalk according to the second embodiment of the present invention.

According to the third embodiment of the present invention, the light measuring device 400 applies the luminance information of the image provided from the light measuring device 400 to the above Equations 1 and 2, to thereby calculate the interocular crosstalk ($X_{RtoL}$) to the left lens 310 for each horizontal viewing angle and vertical viewing angle, and the interocular crosstalk ($X_{LtoR}$) to the right lens 310 for each horizontal viewing angle and vertical viewing angle.

Also, the light measuring device 400 applies the luminance information of the image provided from the light measuring device 400 to the above Equations 3 and 4, to thereby calculate the GTG interocular crosstalk ($X_{RtoL,g1,g2}$) of the image incident via the left lens 310 for each horizontal viewing angle and vertical viewing angle, and the GTG interocular crosstalk ($X_{LtoR,g1,g2}$) of the image incident via the right lens 310 for each horizontal viewing angle and vertical viewing angle.

Figure 12:
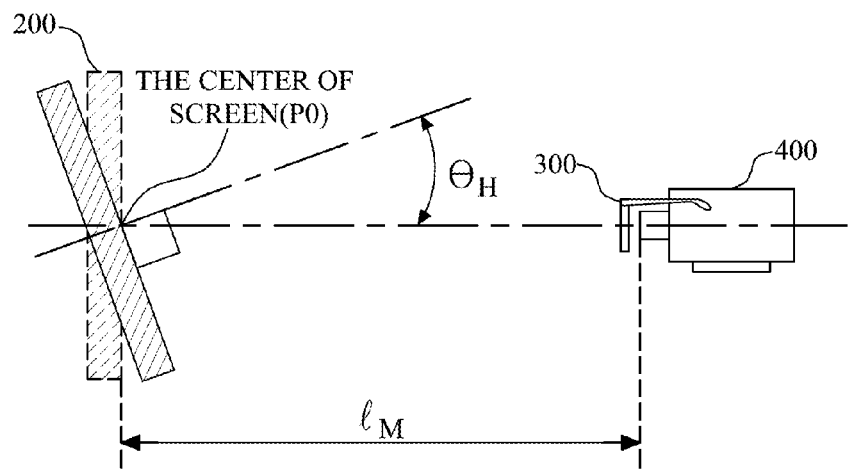

Meanwhile, as shown in FIGS. 10 and 11, the horizontal and vertical viewing angles may be changed by rotating the light measuring device 400 at a predetermined angle. As shown in FIG. 12, the horizontal and vertical viewing angles may be changed by rotating the 3D display 200 in the horizontal and vertical directions at a predetermined angle.

Figure 13:
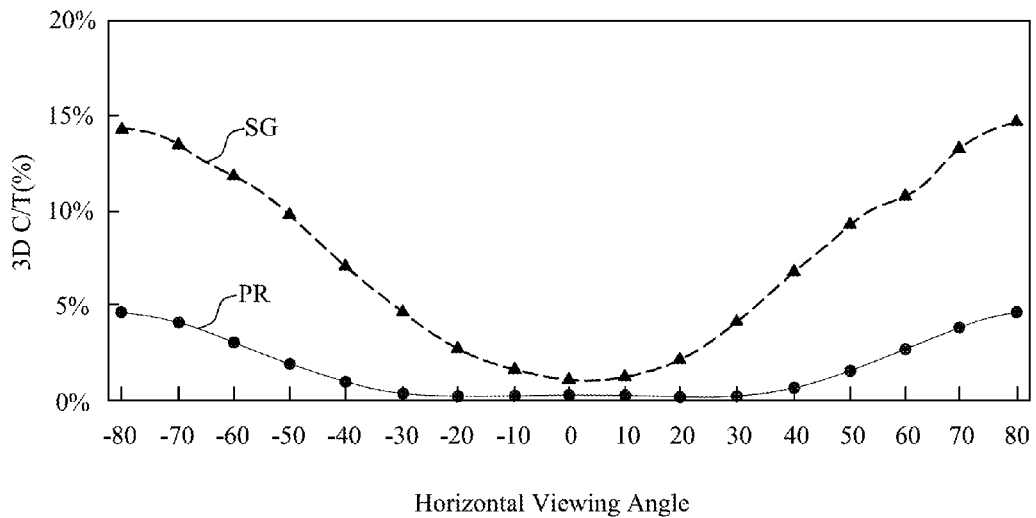
FIG. 13 is a graph schematically illustrating horizontal crosstalk measured by the optical measuring apparatus and method for a stereoscopic display device according to an exemplary embodiment of the present invention.
Figure 14:
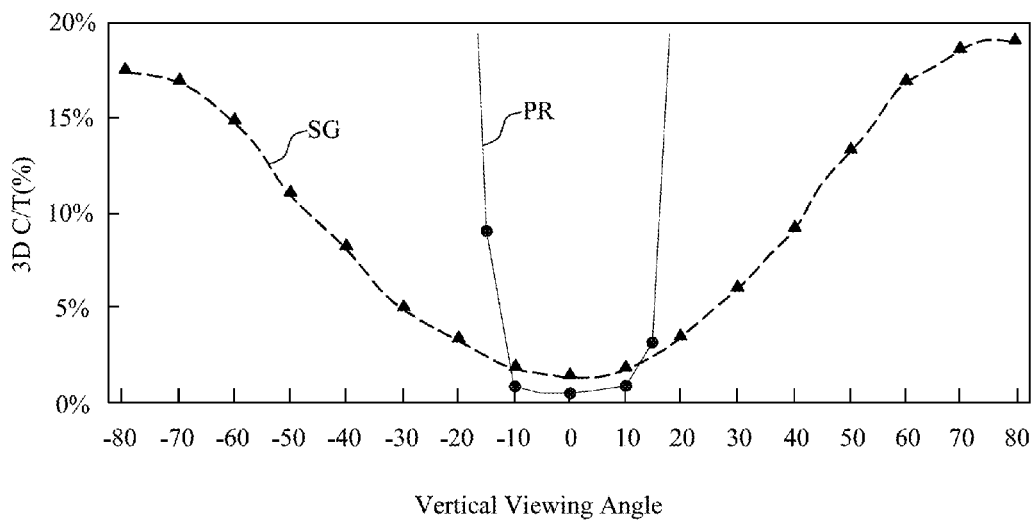
FIG. 14 is a graph schematically illustrating vertical crosstalk measured by the optical measuring apparatus and method for a stereoscopic display device according to an exemplary embodiment of the present invention.

As shown in FIG. 13, crosstalk information for each horizontal viewing angle may be provided to the user. As shown in FIG. 14, the crosstalk information for each vertical viewing angle may be provided to the user. In FIG. 13, 'SG' indicates the crosstalk for each viewing angle of the 3D display adopting the shutter glass method, and 'PR' indicates the crosstalk for each viewing angle of the 3D display adopting the patterned retarder method.

The aforementioned measuring process of the interocular crosstalk for each viewing angle according to the third exemplary embodiment may be carried out after aging the 3D display 200 and image selection member 300 for a predetermined time period. The aforementioned method of measuring the GTG interocular crosstalk according to the third embodiment of the present invention may be carried out after aging the 3D display 200 and image selection member 300 for a predetermined time period. The aforementioned explanation shows that the GTG interocular crosstalk is measured at the measuring point P0, but not necessarily. The GTG interocular crosstalk may be measured at any one of the first to eighth measuring points show in FIG. 4. The aforementioned third embodiment of the present invention enables to measure the objective interocular crosstalk for each viewing angle of the stereoscopic display device and the GTG interocular crosstalk. When a user wearing the image selection member 300 views the 3D image, it is possible to measure how much the right-eye image is interfered by the left-eye image incident via the left lens 310 every horizontal and vertical viewing angle. On the contrary, it is possible to measure how much the left-eye image is interfered by the right-eye image incident via the right lens 320 every horizontal and vertical viewing angle. The user may objectively compare the product functions with the optical characteristics through the crosstalk information which might be used as the product selection standard.

Accordingly, the optical measuring apparatus and method (system) for a stereoscopic display device according to the above-described exemplary embodiments measures the optical characteristics of the left-eye image or right-eye image transmitted via the image selection member 300 by displaying the left-eye image and/or right-eye image on the 3D display 200, and selectively transmitting the left-eye image or right-eye image of the 3D display 200 through the image selection member 300, to thereby enable the objective measurement for the optical characteristics of the 3D display 200.

The optical measuring apparatus and method (system) of stereoscopic display device according to the above-described exemplary embodiments provides the user with the optical characteristic information of the stereoscopic display device.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An optical measuring apparatus of stereoscopic display device comprising:
   a test image supplier for generating a 3D test signal;
   a 3D display for displaying at least one image of a left-eye image and a right-eye image based on the 3D test signal supplied from the test image supplier;
   an image selection member for selectively transmitting the at least one image displayed on the 3D display; and
   a light measuring device that measures luminance of the at least one image transmitted via the image selection member and calculates 3D image crosstalk of the at least one image based on the measured luminance;
   wherein, the 3D image crosstalk includes at least one of interocular crosstalk for the left-eye image and right-eye image, GTG (gray-to-gray) interocular crosstalk for each viewing angle and interocular crosstalk for each viewing angle of the 3D display, and
   a horizontal angle and a vertical angle of the viewing angle are changed within a range from 0° to 90°, and
   wherein the image selection member is provided at an interval of at least 10 mm from the light measuring device,
   wherein the optical measuring apparatus is installed inside a dark room maintained at an illumination of 1 Lux or less, a temperature of 20° C.±5° C., a relative humidity of 25% to 85%, and a pressure of 86 kPa to 106 kPa, and
   wherein a measuring distance between the 3D display and the light measuring device is above 2 meters, or 3L, wherein, 'L' is a height, width, or diagonal length of the screen of the 3D display.

2. The apparatus according to claim 1, wherein the left image and the right image are temporally or spatially divided on the 3D display.

3. The apparatus according to claim 2, wherein the image selection member comprises:
   a left lens for selecting only the left-eye image displayed on the 3D display; and
   a right lens for selecting only the right-eye image displayed on the 3D display.

4. The apparatus according to claim 3, wherein the light measuring device measures the luminance of the at least one image incident via the left lens or right lens at a center measuring point of a screen of the 3D display.

5. The apparatus according to claim 3,
   wherein the left-eye image and right-eye image are displayed on the 3D display as a full screen black image,
   wherein the right-eye image is displayed as a full screen black image when the left-eye image is displayed as a full screen white image, and
   wherein the right-eye image is displayed as a full screen white image when the left-eye image is displayed as a full screen black image.

6. The apparatus according to claim 5,
   wherein the light measuring device calculates interocular crosstalk to the left lens by applying the luminance of the left-eye image incident via the left lens to the following Equation 1, $$X_{RtoL} = \frac{L_{L0.BW} - L_{L0.BB}}{L_{L0.WB} - L_{L0.BB}} \times 100\% \qquad \text{[Equation 1]}$$

wherein ($X_{RtoL}$) indicates the interocular crosstalk to the left lens;
   ($L_{L0,WB}$) indicates the standard luminance value of the left-eye image incident via the left lens according to the left-eye white image and right-eye black image;
   ($L_{L0,BW}$) indicates the standard luminance value of the left-eye image incident via the left lens according to the left-eye black image and right-eye white image; and
   ($L_{L0,BB}$) indicates the standard luminance value of the left-eye image incident via the left lens according to the left-eye black image and right-eye black image.

7. The apparatus according to claim 5, wherein the light measuring device calculates interocular crosstalk to the right lens by applying the luminance of the right-eye image incident via the right lens to the following Equation 2, $$X_{LtoR} = \frac{L_{R0,BW} - L_{R0,BB}}{L_{R0,WB} - L_{R0,BB}} \times 100\% \quad \text{[Equation 2]}$$

wherein ($X_{LtoR}$) indicates the interocular crosstalk to the right lens;

($L_{R0,WB}$) indicates the standard luminance value of the right-eye image incident via the right lens according to the left-eye black image and right-eye white image;

($L_{R0,BW}$) indicates the standard luminance value of the right-eye image incident via the right lens according to the left-eye white image and right-eye black image; and ($L_{R0,BB}$) indicates the standard luminance value of the right-eye image incident via the right lens according to the left-eye black image and right-eye black image.

8. The apparatus according to claim 3, wherein the 3D display displays the left-eye image and right-eye image, gray levels of which are each any one among 256 gray levels from 0 gray level to 255 gray level.

9. The apparatus according to claim 8,
wherein the left-eye image on the 3D display is displayed as a first full screen gray level image corresponding to any one among 256 gray levels from 0 gray level to 255 gray level;

the right-eye image on the 3D display is displayed as a second full screen gray level image corresponding to any one among 256 gray levels from 0 gray level to 255 gray level; and the first full screen gray level image and the second full screen gray level image have the same gray level value, or have the different gray level values.

10. The apparatus according to claim 9, wherein the light measuring device calculates gray-to-gray (GTG) interocular crosstalk of the left-eye image incident via the left lens by applying the luminance value of the left-eye image incident via the left lens to the following Equation 3, $$X_{RtoL,g1,g2} = \frac{L_{L0g2,g1} - L_{L0g2,g2}}{L_{L0g1,g2} - L_{L0g2,g2}} \times 100\% \quad \text{[Equation 3]}$$

wherein ($X_{RtoL,g1,g2}$) indicates GTG interocular crosstalk of the image incident via the left lens;

($L_{L0,g1,g2}$) indicates the luminance value of the image incident via the left lens according to the left-eye first gray level image and right-eye second gray level image;

($L_{L0,g2,g1}$) indicates the luminance value of the left-eye image incident via the left lens according to the left-eye second gray level image and right-eye first gray level image; and ($L_{L0,g2,g2}$) indicates the luminance value of the left-eye image incident via the left lens according to the left-eye second gray level image and right-eye second gray level image.

11. The apparatus according to claim 9,
wherein the light measuring device calculates gray-to-gray (GTG) interocular crosstalk of the right-eye image incident via the right lens by applying the luminance value of the right-eye image incident via the right lens to the following Equation 4, $$X_{LtoR,g1,g2} = \frac{L_{R0g2,g1} - L_{R0g2,g2}}{L_{R0g1,g2} - L_{R0g2,g2}} \times 100\% \quad \text{[Equation 4]}$$

wherein ($X_{LtoR,g1,g2}$) indicates GTG interocular crosstalk of the image incident via the right lens;

($L_{R0,g1,g2}$) indicates the luminance value of the right-eye image incident via the right lens according to the right-eye first gray level image and left-eye second gray level image;

($L_{R0,g2,g1}$) indicates the luminance value of the right-eye image incident via the right lens according to the right-eye second gray level image and left-eye first gray level image; and ($L_{R0,g2,g2}$) indicates the luminance value of the right-eye image incident via the right lens according to the left-eye second gray level image and right-eye second gray level image.

12. The apparatus according to any one of claims 5 to 11, wherein at least one of the 3D display and light measuring device is held vertically to the ground.

13. The apparatus according to claim 12, wherein the light measuring device calculates the interocular crosstalk for each horizontal angle through the use of luminance information of the left-eye image and the right-eye image that are measured by changing the horizontal angle within a range from 0° to 90°.

14. The apparatus according to claim 12, wherein the light measuring device calculates the interocular crosstalk for each vertical angle through the use of luminance information of the left-eye image and the right-eye image that measured by changing the vertical angle within a range from 0° to 90°.

15. An optical measuring method comprising:
displaying at least one image of a left-eye image and a right-eye image based on a 3D test signal;
selectively transmitting the at least one image displayed of the 3D display via an image selection member;
measuring luminance of the at least one image transmitted via the image selection member through the use of light measuring device; and
calculating 3D image crosstalk of the at least one image based on the measured luminance;
wherein, the 3D image crosstalk includes at least one of interocular crosstalk for the left-eye image and right-eye image, GTG (gray-to-gray) interocular crosstalk for each viewing angle and interocular crosstalk for each viewing angle of the 3D display, and
a horizontal angle and a vertical angle of the viewing angle are changed within a range from 0° to 90°, and
wherein the image selection member is provided at an interval of at least 10 mm from the light measuring device,
wherein the optical measuring apparatus is installed inside a dark room maintained at an illumination of 1 Lux or less, a temperature of 20° C.±5° C., a relative humidity of 25% to 85%, and a pressure of 86 kPa to 106 kPa, and
wherein a measuring distance between the 3D display and the light measuring device is above 2 meters, or 3L, wherein, 'L' is a height, width, or diagonal length of the screen of the 3D display.

16. The method according to claim 15, wherein the left-eye image and/or the right-eye image are temporally or spatially divided on the 3D display.

17. The method according to claim 16, wherein the image selection member comprises:
- a left lens for selecting only the left-eye image displayed on the 3D display; and
- a right lens for selecting only the right-eye image displayed on the 3D display.

18. The method according to claim 17, wherein the light measuring device measures the luminance of the at least one image incident via the left lens or right lens at a center measuring point of a screen of the 3D display.

19. The method according to claim 18,
wherein the left-eye image and the right-eye image are displayed on the 3D display as a full screen black image,
wherein the right-eye image is displayed as a full screen black image when the left-eye image is displayed as a full screen white image, and
wherein the right-eye image is displayed as a full screen white image when the left-eye image is displayed as a full screen black image.

20. The method according to claim 19,
wherein interocular crosstalk to the left lens is calculated by applying the luminance of the left-eye image incident via the left lens to the following Equation 1, $$X_{RtoL} = \frac{L_{L0.BW} - L_{L0.BB}}{L_{L0.WB} - L_{L0.BB}} \times 100\% \qquad \text{[Equation 1]}$$

wherein ($X_{RtoL}$) indicates the interocular crosstalk to the left lens;
($L_{L0,WB}$) indicates the standard luminance value of the left-eye image incident via the left lens according to the left-eye white image and right-eye black image;
($L_{L0,BW}$) indicates the standard luminance value of the left-eye image incident via the left lens according to the left-eye black image and right-eye white image; and
($L_{L0,BB}$) indicates the standard luminance value of the left-eye image incident via the left lens according to the left-eye black image and right-eye black image.

21. The method according to claim 19,
wherein interocular crosstalk to the right lens is calculated by applying the luminance of the right-eye image incident via the right lens to the following Equation 2, $$X_{LtoR} = \frac{L_{R0.BW} - L_{R0.BB}}{L_{R0.WB} - L_{R0.BB}} \times 100\% \qquad \text{[Equation 2]}$$

wherein ($X_{LtoR}$) indicates the interocular crosstalk to the right lens;
($L_{R0,WB}$) indicates the standard luminance value of the right-eye image incident via the right lens according to the left-eye black image and right-eye white image;
($L_{R0,BW}$) indicates the standard luminance value of the right-eye image incident via the right lens according to the left-eye white image and right-eye black image; and
($L_{R0,BB}$) indicates the standard luminance value of the right-eye image incident via the right lens according to the left-eye black image and right-eye black image.

22. The method according to claim 18, wherein the 3D display displays the left-eye image and right-eye image, gray levels of which are each among 256 gray levels from 0 gray level to 255 gray level.

23. The method according to claim 22,
wherein the left-eye image on the 3D display is displayed as a first full screen gray level image corresponding to any one among 256 gray levels from 0 gray level to 255 gray level;
the right-eye image on the 3D display is displayed as a second full screen gray level image corresponding to any one among 256 gray levels from 0 gray level to 255 gray level; and
the first full screen gray level image and second full screen gray level image have the same gray level value, or have the different gray level values.

24. The method according to claim 23,
wherein gray-to-gray (GTG) interocular crosstalk of the left-eye image incident via the left lens is calculated by applying the luminance value of the left-eye image incident via the left lens to the following Equation 3, $$X_{RtoL,g1,g2} = \frac{L_{L0g2,g1} - L_{L0g2,g2}}{L_{L0g1,g2} - L_{L0g2,g2}} \times 100\% \qquad \text{[Equation 3]}$$

wherein ($X_{RtoL,g1,g2}$) indicates GTG interocular crosstalk of the left-eye image incident via the left lens;
($L_{L0,g1,g2}$) indicates the luminance value of the left-eye image incident via the left lens according to the left-eye first gray level image and right-eye second gray level image;
($L_{L0,g2,g1}$) indicates the luminance value of the left-eye image incident via the left lens according to the left-eye second gray level image and right-eye first gray level image; and
($L_{L0,g2,g2}$) indicates the luminance value of the left-eye image incident via the left lens according to the left-eye second gray level image and right-eye second gray level image.

25. The method according to claim 23,
wherein the light measuring device calculates gray-to-gray (GTG) interocular crosstalk of the right-eye image incident via the right lens is calculated by applying the luminance value of the right-eye image incident via the right lens to the following Equation 4, $$X_{LtoR,g1,g2} = \frac{L_{R0g2,g1} - L_{R0g2,g2}}{L_{R0g1,g2} - L_{R0g2,g2}} \times 100\% \qquad \text{[Equation 4]}$$

wherein ($X_{LtoR,g1,g2}$) indicates GTG interocular crosstalk of the right-eye image incident via the right lens;
($L_{R0,g1,g2}$) indicates the luminance value of the right-eye image incident via the right lens according to the right-eye first gray level image and left-eye second gray level image;
($L_{R0,g2,g1}$) indicates the luminance value of the right-eye image incident via the right lens according to the right-eye second gray level image and left-eye first gray level image; and
($L_{R0,g2,g2}$) indicates the luminance value of the right-eye image incident via the right lens according to the left-eye second gray level image and right-eye second gray level image.

26. The method according to any one of claims 19 to 25,
wherein at least one of the 3D display and light measuring device is held vertically to the ground.

27. The method according to claim 26, wherein the interocular crosstalk for each horizontal angle are calculated through the use of luminance information of the left image and the right image measured by changing the horizontal angle within a range from 0° to 90°.

28. The method according to claim 27, wherein the interocular crosstalk for each vertical angle are calculated through the use of luminance information of the left image and the right image measured by changing the vertical angle within a range from 0° to 90°.

* * * * *